3,632,780
PHENOXYPROPYLAMINES IN COMPOSITIONS AND METHODS FOR EFFECTING B-SYMPATHOLYTICAL ACTIVITY
Volkert Govert Keizer and Johannes Maria Antonius Zwagemakers, van Houtenlaan, Weesp, Netherlands, assignors to U.S. Philips Corporation, New York, N.Y.
No Drawing. Original application Mar. 22, 1966, Ser. No. 536,320, now Patent No. 3,542,874, dated Nov. 24, 1970. Divided and this application Nov. 24, 1969, Ser. No. 877,592
Claims priority, application Netherlands, Apr. 3, 1965, 6504268
Int. Cl. A61k 27/00
U.S. Cl. 424—330                  14 Claims

ABSTRACT OF THE DISCLOSURE

Pharmaceutical compositions containing aloxythiophenoxy N substituted hydroxy-propylamino-propanes. The compositions are useful in treating disesases requiring use of agents exhibiting β-sympatholytical activities.

---

This application is a division of applicants' copending U.S. Patent application No. 536,320, filed Mar. 22, 1966 and now U.S. Pat. No. 3,542,874.

The invention relates to novel phenoxypropylamines, to pharmaceutical preparations containing said phenoxypropylamines and to methods of producing and utilizing said phenoxypropylamines and preparations.

A principal object of our invention is to produce a new and novel group of compounds exhibiting β-sympatholytic activities.

Another object of our invention is to provide a new and novel method of treating β-sympathomimetic disturbances in mammals.

These and other objects of our invention will be apparent from the description that follows:

From the Irish patent application 900/64 it is known that compounds of the Formula I:

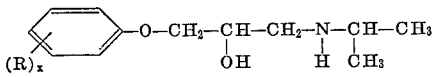

wherein R may designate a halogen atom, a branched or straight chain alkyl- or alkoxy group having 1 to 4 carbon atoms and $x$ may have the value 1, 2 or 3, have a strong β-sympatholytical activity.

According to our invention we have prepared a new and novel group of compounds of the formula:

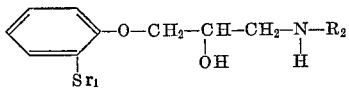

wherein $R_1$ is alkyl of 1 to 4 carbon atoms inclusive and $R_2$ is a member selected from the group consisting of alkyl of 1 to 12 carbon atoms inclusive, alkenyl of 2 to 12 carbon atoms inclusive, alkinyl of 2 to 12 carbon atoms inclusive, cycloalkyl of 2 to 12 carbon atoms inclusive and aralkyl of 7 to 12 carbon atoms inclusive and the pharmaceutically acceptable acid addition salts thereof.

We have found unexpectedly that the β-sympatholytical activities of these compounds are significantly greater than the compounds of said Irish patent.

This definition of the compounds according to the invention includes both the stereoisomers and mixtures thereof.

$R_1$ may represent for example methyl, ethyl, n.propyl i.propyl or sec.butyl among others. $R_2$ may represent such alkyls as methtyl t. butyl, hexyl, nonyl or dodecyl, such akenyl groups as allyl, vinyl, pentenyl or decenyl as well as many others. $R_2$, when alkinyl, may represent propinyl, ethinyl, hexinyl, among others, $R_2$, when cycloalkyl, may represent cyclopropyl, cyclopentyl, cyclohexyl or cyclooctyl, among others. Also, $R_2$, when aralkyl, may represent benzyl, phenylpropyl, phenylbutyl or phenylpentyl, among others.

The compounds according to the invention have very effective β-adrenergetically blocking properties and are strong antagonists of β-sympathicomimetica, for example N-isopropylnoradrenaline.

Owing to these properties the compounds may be employed, when suitably prepared for administration, for suppressing or preventing tachycardia caused by β-sympathicomimetica. They may furthermore be used for treating certain forms of hypertension, angina pectoris, heart arhythmia, digitalis poisoning and phaeochromocytoma.

An important property of the compounds according to the invention is that they are only very slightly toxic for warm-blooded animals. With 1-(2-methylthiophenyl)-2-hydroxy - 3-i.propylaminopropane for example an $LD_{50}^{48}$ of 126 mg./kg. i.p. and 348 mg./kg. oral has been assessed.

In accordance with the nature and the gravity of the illness to be treated, the compounds may be administered in a daily dose of about 20 to about 400 mgs. This quantity may be administered in one batch or in a number of portions. It will, in general, not be difficult for the physician to prescribe the correct quantity and the correct schedule of administration.

Administration may be carried out orally, rectally by means of suppositories or parenterally.

Examples of the compounds according to the invention are:

1-(2-methylthiophenoxy)-2-hydroxy-3-t. butylaminopropane,
1-(2-methylthiophenoxy)-2-hydroxy-3-(1-methyl-3-phenylpropylamino)-propane,
1-(2-methylthiophenoxy)-2-hydroxy-3-cyclopentylaminopropane,
1-(2-ethylthiophenoxy)-2-hydroxy-3-i.propylaminopropane,
1-(2-ethylthiophenoxy)-2-hydroxy-3-t.butylaminopropane,
1-(2-n.propylthiophenoxy)-2-hydroxy-3-t.butylaminopropane,
1 - (2 - n.propylthiophenoxy) - 2 - hydroxy - 3 - (1-methyl-3-phenylpropylamino)-propane,
1 - (2 - sec.butylthiophenoxy) - 2 - hydroxy - 3 - allylaminopropane,
1 - (2-t.butylthiophenoxy) - 2 - hydroxy - 3 - cyclopentylaminopropane,
1 - (2 - methylthiophenoxy) - 2 - hydroxy - 3 - cyclohexylaminopropane,
1 - (2 - methylthiophenoxy) - 2 - hydroxy - 3 - cyclopropylaminopropane,
1 - (2 - ethylthiophenoxy) - 2 - hydroxy - 3 - hexinyl-1 aminopropane,
1 - (2 - sec.butylthiophenoxy) - 2 - hydroxy - 3 - benzylamino-propane, and moreover salts of these compounds with pharmaceutically acceptable acids.

Suitable acids with which the compounds according to the invention can form salts are, for example, hydrochloric acid, sulphuric acid, hydrobromic acid, phosphoric acid, sulphaminic acid, tartaric acid, citric acid, oxalic acid and acetic acid.

The β-sympatholytical activity of the compounds according to the invention was assessed by tests on an isolated cavia atrium preparation, suspended in a Ringer solution and connected with a frequency counter. By adding N-isopropylnoradrenaline, this preparation exhibits an increase in frequency. It has been checked to what extent this increase in frequency can be counteracted by administering a compound according to the invention prior to the N-isopropylnoradrenaline.

It has been found from said test that the compounds according to the invention have a much stronger β-sympatholytical activity than the compounds described in said Irish patent application. It has been found, for example, that 1 - (2-methylthiophenoxy) - 2 - hydroxy-3-i. propylaminopropane has a ten times stronger effect than 1 - (3-chlorophenoxy) - 2 - hydroxy - 3 - i.propylaminopropane, a compound qualified in said Irish patent application as being the most active compound.

With an anaesthetized dog also it is found that the increase in heart frequency and the reduction of blood pressure involved in β-sympathicomimetica are obviated, if an infusion of a compound according to the invention is administered prior to the β-sympathicomimeticum.

This experiment also showed that 1-(2-methylthiophenoxy) - 2 - hydroxy-3-i.propylaminopropane was considerably more active than 1-(3-chlorophenoxy)-2-hydroxy-3-i.propylaminopropane.

The compounds according to the invention may be produced by several different methods.

Thus the compounds may be produced by reacting a compound of the Formula III:

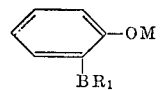

wherein $R_1$ has the same meaning as in Formula II and M is a hydrogen atom or an alkaline metal, with a compound of the Formula IV:

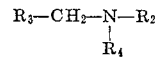

wherein $R_2$ has the same meaning as in Formula II, $R_3$ is a Hal-

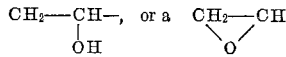

group, wherein Hal is a halogen atom and $R_4$ is a hydrogen atom or a benzyl-group, the benzyl group, if any, being separated from the reaction product.

This reaction is preferably carried out in a solvent such as an alcohol, for example ethanol, dioxane, dimethylformamide and water.

The benzyl-group may be separated out in a conventional manner, for example by the reduction with sodium in liquid ammonia or in alcohol.

The compounds of the Formula III are partly new. They may be obtained by starting from O-mercaptaniline, which is alkylated with an alkyl-halide, for example the iodide or bromide, the reaction product being converted via the diazonium compound into the corresponding phenol.

The compounds of the Fomula IV may be obtained by known methods. For example, a 1,3-dihalogen-propanol-2 or epihalogen-hydrine may be reacted with an amine of the Formula V:

wherein $R_2$ and $R_4$ have the same meaning as in Formula IV. By classical methods, for example by means of a strong liquor, the epoxide can be obtained from the resultant halogen hydrine.

A further method of producing compounds of the Formula II consists in that a compound of the Formula VI:

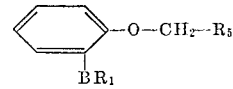

wherein $R_1$ has the same meaning as in Formula II and $R_5$ is a

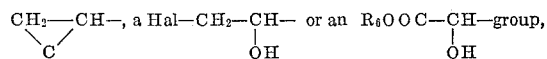

Hal a halogen atom and $R_6$ an alkyl or aralkyl group, with an amine of the Formula V, an amide group, if any, being reduced and the benzyl-group, if any, being separated out of the reaction product in the manner described above.

In this reaction for example the amine may be used as a solvent. As an alternative, a polar solvent, for example ethanol, may be added.

The halogen hydrines of the Formula VI may be obtained by reacting a compound of the Formula III with an epihalogen hydrine, for example epichlorohydrine. The epoxides of the Formula VI may be produced in the conventional manner, for example, from the aforesaid halogen hydrines of the Formula VI.

The α-hydroxy-carboxylic acid esters of the Formula VI may be produced by reacting a phenol of the Formula III in a suitable solvent, for example, ethanol, with an α-hydroxy-β-halogen-propionic acid ester.

Compounds according to the invention may furthermore be produced by alkylating, if desired by reduction, a compound of the Formula VII

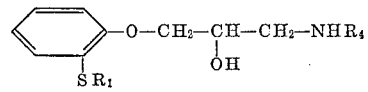

wherein $R_1$ has the same meaning as in Formula II and $R_4$ is a hydrogen atom or a benzyl group and by separating out the benzyl group, if any, after bonding.

The alkylation may be carried out with a compound of the Formula VIII:

wherein X is a Hal $CH_2$-group, a

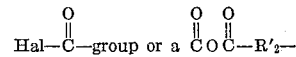

group, $R'_2$ a group like $R_2$ but having one C-atom less and Hal is a halogen atom, while if X is a

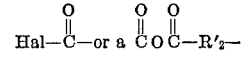

group, the bonding product is reduced. This reduction may be carried out with a hydride, for example sodium boron hydride, lithium-aluminum hydride and di-isobutylaluminum-hydride.

It is furthermore possible to carry out the reaction with a reagent of the Formula IX:

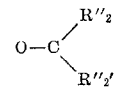

wherein $R''_2$ and $R''_{2'}$, together with the carbon atom of the carbonyl group, form a substituent of the group $R_2$ of the Formula II. If this agent is used, the starting material must be a compound of Formula VII, wherein $R_4$ is a hydrogen atom and the coupling product is reduced with a hydride, for example, sodium boron hydride, lithium-aluminum hydride and diisobutyl-aluminum hydride.

The compounds of Formula II may also be obtained by reducing a compound of the Formula X

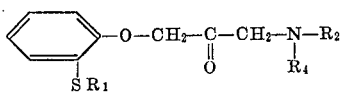

wherein R₁, R₂ and R₄ have the aforesaid meanings and by separating out the benzyl-group, if any. The reduction is preferably carried out with a hydride, for example, sodium-boron hydride, lithium-aluminum-hydride, diisobutyl-aluminum hydride. The compound of the Formula X may be produced by coupling a compound of the Formula III with an 1-3-dihalogen-acetone, for example 1,3-dichloroacetone to a compound of the Formula XI.

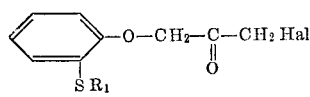

which substance is then converted in a solvent, for example, benzene, ethanol with an amine of the Formula V; heating may be applied to obtain complete reaction.

The compounds of the Formula II may furthermore be produced by reducing a compound of the Formula XII

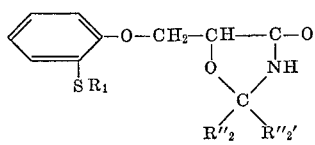

wherein R₁ has the meaning given in Formula II and R″₂, R″₂, have the same meanings as in Formula IX, for example by means of lithium-aluminum hydride.

A compound of the Formula XII may be obtained by condensation of a compound of the Formula X with an amide of the Formula XIII wherein R₁ has the meaning given in Formula II.

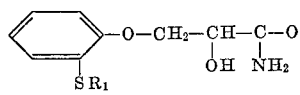

Compounds of the Formula XIII may be produced in a conventional manner for example by the addition of a compound of the Formula III to the amide of 2,3-epoxypropionic acid.

The compounds according to the invention may be processed by conventional methods to obtain pharmaceutical preparations by mixing or dissolving them with or in pharmaceutically acceptable solid or liquid carriers.

Suitable pharmaceutical preparations among others are tablets, dragees, powders, aqueous or oil-like solutions, suspensions and emulsions both for oral and parenteral administration, suppositories and capsules.

Carriers that may be used successfully are, for example, water, glycerine, chalk, calcium phophate, lactic sugar, powder sugar, (saccharose), calcium carbonate.

Tablets and dragees may contain swelling agents for easy dissociation of the preparation in water. Suitable material for swelling agents are potato starch, maize starch, arrowroot (*Amylum marantae*), carboxymethyl cellulose, gelatine and acasia gum. Lubricants are for example talcum, magnesium and calcium stearates and stearic acid.

Oral preparations may contain, in addition, flavoring substances such as sugar or vanilla extract.

The preparations may furthermore contain preserving agents such as propyl p-hydroxybenzoate and benzylalcohol, as well as surface-active substances such as mono-, di- and triesters of higher fatty acids.

Our invention will now be more fully described with reference to the following examples:

Injection liquid

| | G. |
|---|---|
| 1 - (2-methylthiophenoxy) - 2 - hydroxy - 3 - i.propylaminopropane | 1 |
| Methyl-p-hydroxy-benzoate | 1.80 |
| Propyl p-hydroxybenzoate | 0.20 |
| Sodium chloride | 9.0 |
| Polysorbate 80 USP | 4.0 |
| Water up to 1000 mls. | |

Tablet

| | Mg. |
|---|---|
| 1 - (2-methylthiophenoxy) - 2 - hydroxy - 3 - i.propylaminopropane | 20 |
| Lactose | 335 |
| Potato starch | 60 |
| Talcum | 25 |
| Magnesium stearate | 5 |
| Gelatine | 5 |

Suppository

| | Mg. |
|---|---|
| 1 - (2-methylthiophenoxy) - 2 - hydroxy - 3 -i.propylaminopropane | 15 |
| Suppositoria mass | 1500 |

EXAMPLES OF PRODUCING THE COMPOUNDS (1a) 1,2-epoxy-3-(2-methylthiophenoxy)-propane 11.92 g. (0.085 mol) of 2-methylthiophenol was dissolved in a solution of 5.4 g. (0.134 mol) of NaOH in 110 ml. of water and at a temperature below 20° C., 15.7 g. (13.4 ml.=0.17 mol) of epichlorohydrine was added in drops. The mixture was then stirred for one night at room temperature. The layers were separated and the aqueous layer was shaken three times with 30 mls. of chloroform. The organic layers were collected and washed with water. After drying on sodium sulphate the solvent was evaporated in vacuo and the residue was distilled in vacuo.

The main fraction had a weight of 1.96 g. and distilled between 106° C. and 108° C. at 0.20 mm.

(1b) 1 - (2-methylthiophenoxy)-2-hydroxy-3-isopropylaminopropanehydrochloride 1.96 g. (0.010 mol) of 1,2-epoxy-3-(2-methylthiophenoxy)-propane was dissolved in 7.5 ml. of ethanol, after which 1.2 g. (0.021 mol) of isopropylamino in 1.2 ml. of water was added. The mixture was heated at 60° for two hours. After termination of the reaction the solvent and the excess quantity of isopropylamine was evaporated in vacuo. Melting point of the base 87.5–90.5° C. (after crystallization from ligroine). The base was dissolved in absolute ethanol and just acidified with 4 N alcoholic hydrochloride acid. The solution was diluted with absolute ether. A substance having a melting point of 117–123° C. crystallized out. After one recrystallization from alcohol-ether: melting point 125–127° C.

(2) 1-(2-methylthiophenoxy)-2-hydroxy-3-t.butylaminopropanehydrochloride

In the manner described in Example 1b t.butylamine was used instead of isopropylamine to obtain a hydrochloride; melting point 94–96° C.

(3) 1-(2-methylthiophenoxy)-2-hydroxy-3-1-methylphenylpropylaminopropane-hydrochloride In the manner described in Example 1b 1-methyl-3-phenylpropylamine was used instead of isopropylamine to obtain a hydrochloride having a melting point of 121–127° C.

(4) 1-(2-methylthiophenoxy)-2-hydroxy-3-cyclopentylaminopropanehydrochloride

In the same manner as described in Example 1b cyclopentylamine instead of isopropylamine yielded a hydrochloride having a melting point of 153–156° C.

(5) 1-(2-methylthiophenoxy)-2-hydroxy-2-allylaminopropane-hydrochloride

In the same manner as described in Example 1b alkylamine instead of isopropylamine was used to obtain a hydrochloride having a melting point of 104–105° C.

(6a) 1,2-epoxy-3-(2-ethylthiophenoxy)-propane

To 8.3 g. (0.053 mol) of O-ethylthiophenol was added 20.0 g. (0.215 mol) of epichlorohydrine and 0.07 ml. of piperidine. The mixture was heated on a steam bath for one night. After the excess quantity of epichlorohydrine and the piperidine were removed, the residue was distilled in vacuo.

Boiling point 130–133° C./0.4 mm.

(6b) 1-(2-ethylthiophenoxy)-2-hydroxy-3.i.propylaminopropanehydrochloride 4.29 g. (0.02 mol) of 1,2-epoxy-3-(2-ethylthiophenoxy)-propane was dissolved in 20 mls. of ethanol, to which was added a cooled solution of 3.5 g. (0.06 mol) is isopropylamine in 3.8 ml. of water. The mixture was heated at 37° for one hour and then for one night at 55° C.

The solution was evaporated to dryness in vacuo and dissolved twice in benzene and again evaporated to dryness.

The residue, 5.5 gs. of oil, was crystallized from ethylacetate petroleum ether 40–60. The substance was then dissolved in 14 mls. of ethanol, 2.5 mls. of 4.2 N alcoholic HCl and 150 mls. of dry ether were added to this solution. A crystalline precipitate was obtained, filtered and washed with ether. After recrystallization from ethanol-ether, the substance was dried in a vacuum exsiccator.

Melting point 110.5–112.5° C.

What we claim is:

1. A pharmaceutical composition comprising in unit dosage form a compound selected from the group consisting of a base of the formula

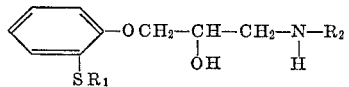

wherein $R_1$ is alkyl of 1 to 4 carbon atoms inclusive and $R_2$ is a member selected from the group consisting of alkyl of 1 to 12 carbon atoms inclusive, allyl, vinyl, pentenyl, decenyl, propinyl, ethinyl, hexinyl, cyclopropyl, cyclopentyl, cyclohexyl, cyclooctyl and aralkyl of 7 to 12 carbon atoms inclusive and the pharmaceutically acceptable acid addition salts thereof in an amount sufficiently large to cause a β-adrenergic blocking activity in humans and a pharmaceutically acceptable carrier therefor.

2. The pharmaceutical composition of claim 1 wherein the compound is 1-(2-methylthiophenoxy)-2-hydroxy-3-i.propylaminopropane-hydrochloride.

3. The pharmaceutical composition of claim 1 wherein the compound is 1-(2-methylthiophenoxy)-2-hydroxy-3-t.butylaminopropane-hydrochloride.

4. The pharmaceutical composition of claim 1 wherein the compound is 1-(2-methylthiophenoxy)-2-hydroxy-3-(1-methyl-3-phenylpropylamino)-propane-hydrochloride.

5. The pharmaceutical composition of claim 1 wherein the compound is 1-(2-methylthiophenoxy)-2-hydroxy-3-cyclopentylaminopropane-hydrochloride.

6. The pharmaceutical composition of claim 1 wherein the compound is 1-(2-methylthiophenoxy)-2-hydroxy-3-allylaminopropane-hydrochloride.

7. The pharmaceutical composition of claim 1 wherein the compound is 1-(2-ethylthiophenoxy)-2-hydroxy-3-i.propylaminopropane-hydrochloride.

8. A method of treating a human for β-sympathomimetic disturbances comprising administering to said human a daily dose of about 29 to 400 mg. of a compound selected from the group consisting of a base of the formula

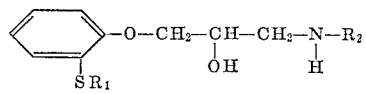

wherein $R_1$ is alkyl of 1 to 4 carbon atoms inclusive and $R_2$ is a member selected from the group consisting of alkyl of 1 to 12 carbon atoms inclusive, alkenyl of 2 to 12 carbon atoms inclusive, alkinyl of 2 to 12 carbon atoms inclusive, cycloalkyl of 2 to 12 carbon atoms inclusive and aralkyl of 7 to 12 carbon atoms inclusive and the pharmaceutically acceptable acid addition salts thereof.

9. The method of claim 8 wherein the compound is 1-(2 - methylthiophenoxy)-2-hydroxy-3-i.propylaminopropane-hydrochloride.

10. The method of claim 8 wherein the compound is 1-(2 - methylthiophenoxy)-2-hydroxy-3-t.butylaminopropane-hydrochloride.

11. The method of claim 8 wherein the compound is 1-(2 - methylthiophenoxy)-2-hydroxy-3-(1-methyl-3-phenylpropylamino)-propane-hydrochloride.

12. The method of claim 8 wherein the compound is 1-(2-methylthiophenoxy)-2-hydroxy-3-allylaminopropane-hydrochloride.

13. The method of claim 8 wherein the compound is 1-(2 - methylthiophenoxy)-2-hydroxy-3-cyclopentylaminopropane-hydrochloride.

14. The method of claim 8 wherein the compound is 1-(2-ethylthiophenoxy) - 2 - hydroxy-3-i.propylaminopropane-hydrochloride.

No references cited.

STANLEY J. FRIEDMAN, Primary Examiner